(12) United States Patent
Chen et al.

(10) Patent No.: US 7,338,323 B2
(45) Date of Patent: Mar. 4, 2008

(54) ELECTRICAL CONNECTOR ASSEMBLY

(75) Inventors: Hsiang-Ping Chen, Tu-Cheng (TW); Chih-Yuan Liao, Tu-Cheng (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 11/645,371

(22) Filed: Dec. 26, 2006

(65) Prior Publication Data

US 2007/0105419 A1    May 10, 2007

(30) Foreign Application Priority Data

Dec. 26, 2005    (TW) ............................... 94222626 U

(51) Int. Cl.
*H01R 24/00* (2006.01)

(52) U.S. Cl. ...................... 439/630; 439/385

(58) Field of Classification Search ................ 439/327, 439/385, 607, 630, 928.1, 297, 298, 374; 361/685
See application file for complete search history.

(56) References Cited

U.S. PATENT DOCUMENTS 5,548,480 A * 8/1996 Rudi et al. ................. 361/685
6,215,666 B1 * 4/2001 Hileman et al. ............ 361/752
6,798,652 B2 * 9/2004 Wang et al. ................ 361/685
7,036,783 B2 * 5/2006 Chen et al. ............... 248/298.1
7,072,178 B2 * 7/2006 Chen et al. ................ 361/685
7,083,441 B1 * 8/2006 Lee ............................ 439/148
7,101,227 B2 * 9/2006 Kuo ........................... 439/630

* cited by examiner

*Primary Examiner*—Thanh-Tam Le
(74) *Attorney, Agent, or Firm*—Wei Te Chung

(57) ABSTRACT

An electrical connector assembly comprises a hard disk (2), an electrical connector (3) and a bracket (1) for receiving the hard disk (2) and the electrical connector (3) therein. The bracket (1) comprises a base portion (10), a pair of sidewalls (11) extending upwardly from the base portion (10) a first recess (110) and a first elastic plate (126) partly receiving in the first recess (110). Besides, the two sidewalls (11) define a pair of enveloping member (12) closing to each other. Each enveloping member (12) comprises a second recess (122) and a second elastic plate (126) engaging with the second recess (122). When assembled, the second elastic plate (126) is partly received in the second recess (122).

17 Claims, 5 Drawing Sheets

US 7,338,323 B2

ELECTRICAL CONNECTOR ASSEMBLY

BACKGROUND OF THE INVENTION

1. Field of the Invention

The present invention relates to the art of an electrical connector assembly, and more particularly to an electrical connector assembly provided for electrically connecting to a printed circuit board (PCB).

2. Description of the Prior Art

Electrical connector assemblies are widely used in the connector industry for electrically connecting to a printed circuit board (PCB) in personal computer. Conventionally, an electrical connector assembly as shown in FIG. 1 mainly comprises a bracket 1', a hard disk 2', and an electrical connector 4' and a printed circuit board 3' with a first portion 32' engaging with the bracket 1' and a second portion 31' opposite to the first portion 32' and a number of receiving hole, and a number of screw members 5' received in the corresponding receiving holes using for fastening the printed circuit board 3' and the bracket 4' together. The bracket 1' is configured to engage with the hard disk 2' and comprises a base portion 10', two sidewalls 11' extending perpendicularly from the base portion 10', a recess 12' defined on each sidewalls 11' and a pair of elastic plates 14' anchored on the sidewalls 11' and partly receiving in the recess 12'. In this state, the base portion 10' and the two sidewalls 11' cooperatively form a receiving space for receiving the hard disk 2'.

When assembled, the elastic plate 14' is firstly secured on the recess 12' of the two sidewalls 11', and then connecting the printed circuit board to an end of the bracket 1'. At last, inserting the hard disk 2' from the other end of the bracket 1', then the hard disk 2' is connected to the printed circuit board 3'.

However, with the technology development, the electrical connector assembly has more and more parts thereof and a complicate structure, hence the stability and reliability of the electrical connector assembly has been more and more demanded. In the process of inserting the hard disk 2' into the aforementioned electrical connector assembly, the hard disk 2' is only leaded by the two sidewalls 11' of the bracket 1'; thereby the hard disk 2' is prone to deviate a desire position due to a slant force of the elastic plate 14' applied on the hard disk 2'. In addition, when the electrical connector 4' is battled by an outer force, the hard disk 2' received in the bracket 1' can shake along a direction of perpendicularly the base portion 10', hence leading to a destroy between the hard disk 2' and the electrical connector 4'.

Thus, there is a need to provide a new electrical connector assembly that overcomes the above-mentioned problems.

SUMMARY OF THE INVENTION

Accordingly, an object of the present invention is to provide an electrical connector assembly able to reliably secure a hard disk in the electrical connector assembly.

To fulfill the above-mentioned object, an electrical connector assembly in accordance with a preferred embodiment comprises a hard disk, an electrical connector and a bracket for receiving the hard disk and the electrical connector. The bracket comprises a base portion, a pair of sidewalls extending upwardly from the base portion a first recess and a first elastic plate partly received in the first recess. Besides, the two sidewalls define a pair of enveloping members closing to each other. Each enveloping member comprises a second recess and a second elastic plate engaging with the second recess. When assembled, the second elastic plate is partly received in the second recess.

Relative to the present technology, the enveloping members disposed on the bracket improve the stability of the hard disk receiving in the bracket, abbreviate the attack on the hard disk during the assembling of carrying the electrical connector assembly. Furthermore, the enveloping member can lead the hard disk during inserting the bracket, simplify the assembling process, and enhance the locating accuracy.

Other objects, advantages and novel features of the present invention will become more apparent from the following detailed description when taken in conjunction with the accompanying drawings, in which:

DESCRIPTION OF PREFERRED EMBODIMENT OF THE INVENTION

Reference will now be made to the drawings to describe the present invention in detail.

Figure 1:
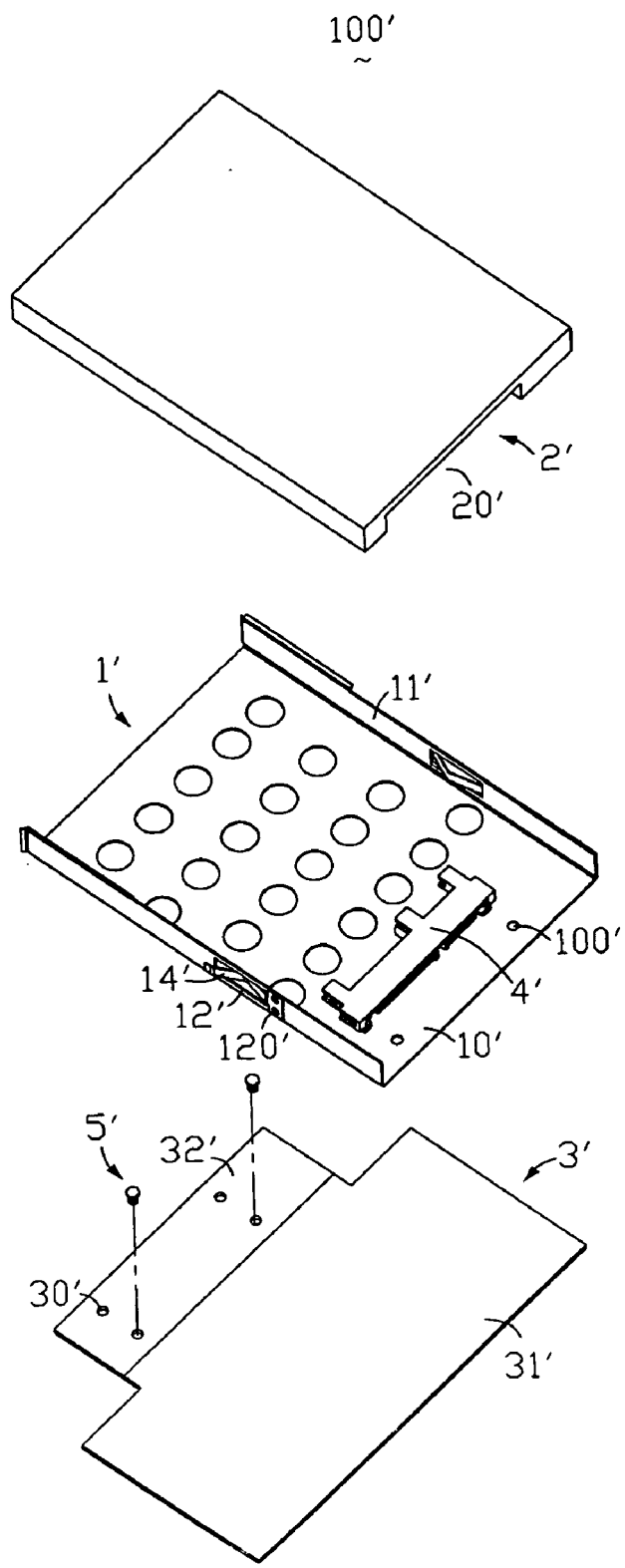
FIG. 1 is an exploded, isometric view of a conventional electrical connector.
Figure 2:
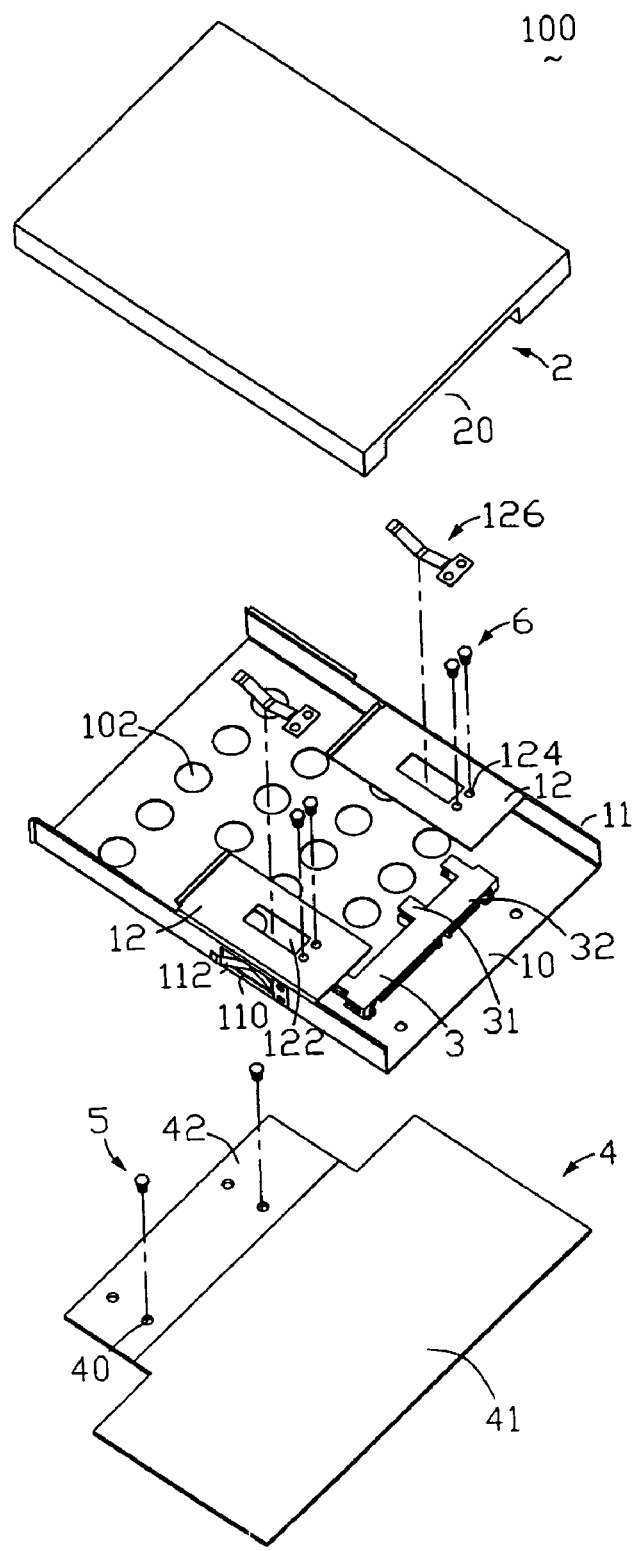
FIG. 2 is an exploded, isometric view of an electrical connector assembly in accordance with a preferring embodiment of the invention.
Figure 3:
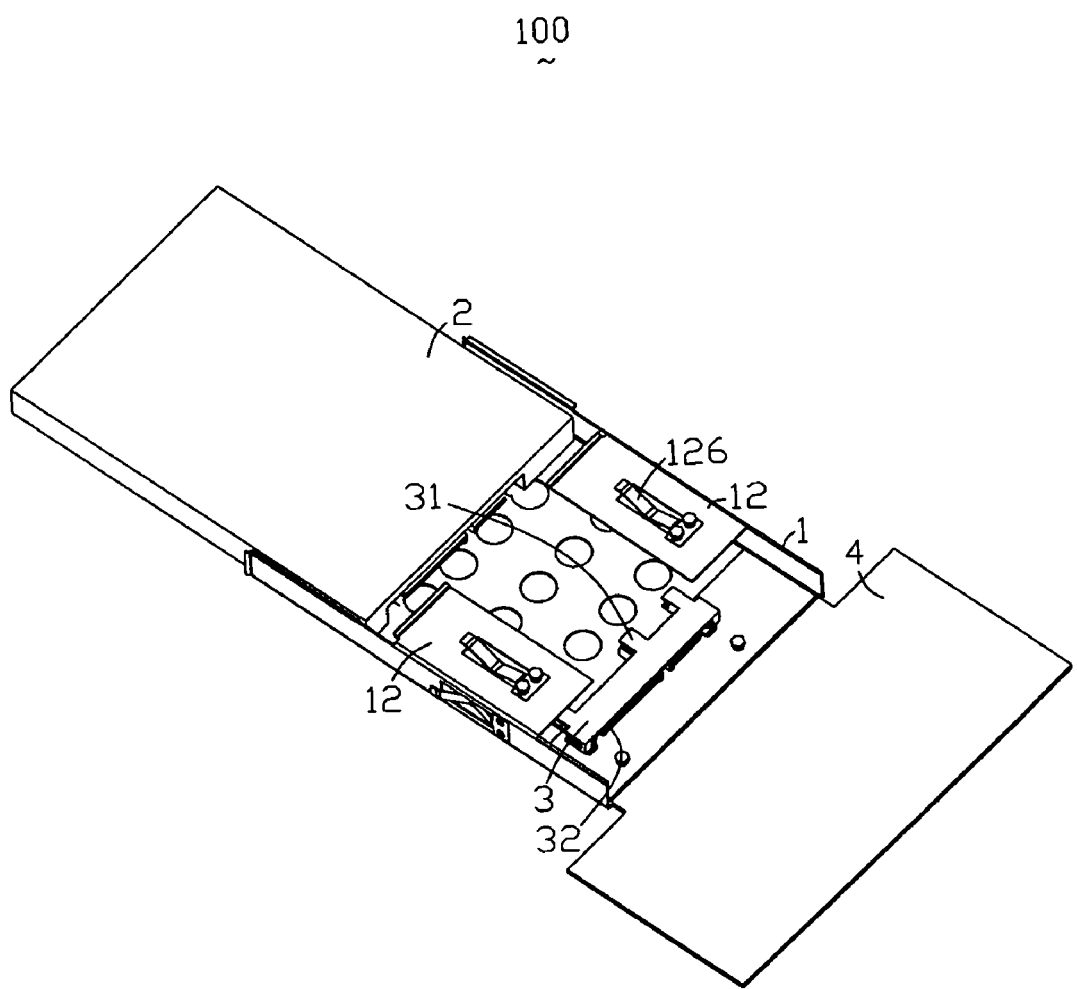
FIG. 3 is a perspective view of the electrical connector shown in FIG. 2, wherein the hard desk is inserted into the bracket.
Figure 4:
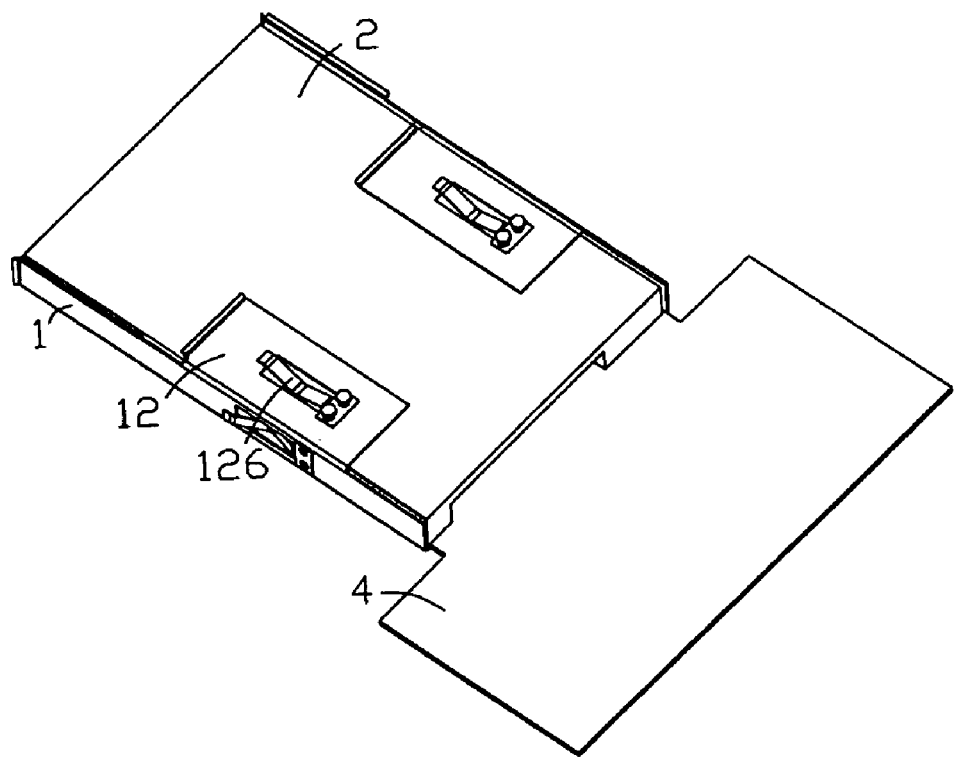
FIG. 4 is an assembled, isometric view of the electrical connector assembly of FIG. 2.
Figure 5:
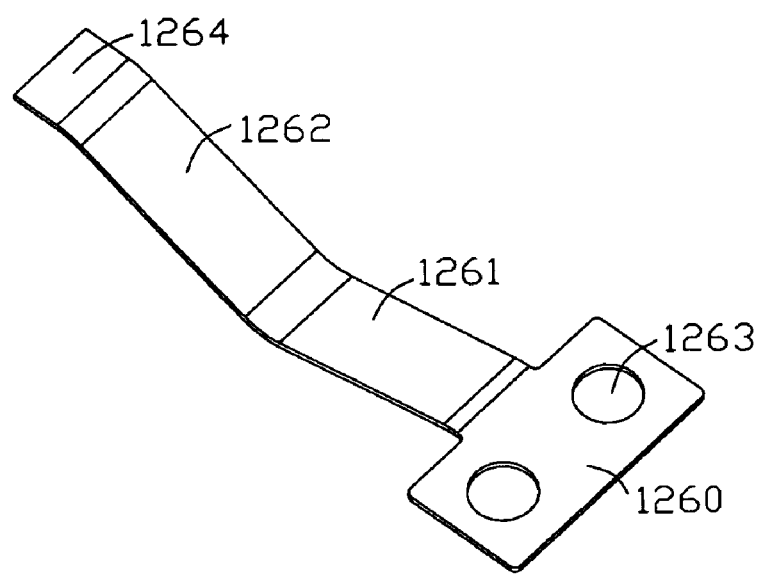
FIG. 5 an isometric view of the elastic plate shown in the electrical connector assembly of FIG. 2.

Referring to FIGS. 2-5, an electrical connector assembly in accordance with a preferred embodiment of the present invention comprises a bracket 1, a hard disk 2, an electrical connector 3. The bracket 1 connects the hard disk 2 and the electrical connector 3 to a printed circuit board 4 and a number of screw members 5 for fastening the bracket 1 and the printed circuit board 4.

The rectangular bracket 1 defines a base portion 10. The base portion 10 defines a plurality of first holes 102 for decreasing the weight of the bracket 1, a pair of sidewalls 11 extending perpendicularly from the base portion 10, a pair of first recess 110 disposed on the two sidewalls 11 and a pair of elastic plate 112 received in the recess 110. The first elastic plates 112 are mounted on the sidewalls 11 and partly received in the first recess 110 for securing the hard disk 2. The two sidewalls 11 define a pair of enveloping members 12 extending along a direction parallel to the base portion 10. Each enveloping member 12 comprises a second recess 122 thereof, a second elastic plate 126 partly received in the second recess 122 and a riveting nail 127 for securing the second elastic plate 126 on the enveloping member 12. The second elastic plate 126 comprises a fixed portion 1260, a securing portion 1261, a V-shaped elastic portion 1262 extending curved from the securing portion 1261, the elastic portion 1262 passes through the second recess 122 and projects towards the base portion 10. The elastic portion 1262 defines an anchoring portion 1264. The fixed portion 1260 defines a second through hole 1263. The enveloping member 12 defines a plurality of third holes 124 corresponding to the second hole 1263. So the riveting nails 127 pass through the second holes 1263 and the third holes 124 in turn connecting the second elastic plate 126 to the enveloping member 12. The enveloping member 12, the elastic plate 126 thereof and the base portion 10, the two sidewalls 11 cooperatively form a four-side receiving space for receiving the hard disk 2 therein, thereby enhancing the antiknock effect of the hard disk 2 received in the bracket 1 along a direction perpendicularly to the base portion 10 and improving the leading effect of the bracket 1 applied on the hard disk 2 during the assembly.

The hard disk 2 has a rectangular shape and defines a receiving concave 20 for receiving the electrical connector 3 therein.

The printed circuit board 4 has a rectangular shape and comprises a first portion 42 for engaging with the bracket 1 and a second portion 41 opposite to the first portion 42 and a number of receiving holes 40 defined on the first end 42 for receiving the screw members 5 therein.

The electrical connector 3 comprises a first end connecting 31 with the hard disk 2 and a second end 32 engaging with an outer electrical device. The electrical connector 3 is mounted on the bracket 1 by a locking mechanism.

In assembly, firstly fixing the first elastic plates 112 on the sidewalls 11, and the first elastic plate 112 being secured partly in the first recess 110 of the sidewalls 112, the second elastic plate 126 being secured in the second recess 122. Successively, mounting the electrical connector 3 on the base portion 10 of the bracket 1. Then connecting the printed circuit board 4 to an end of the bracket 1 then using the screw members fastening the printed circuit board and the bracket together. At last, the hard disk 2 is inserted into the bracket 1 from the other end of the bracket 1. In this position, the hard disk 2 is connected to the printed circuit board 4.

As stated above, the disposition of the enveloping member 12 of the bracket 1 and the second elastic plate 126 prevent the swing of the hard disk 2 received in the bracket 1, ensure a stable mechanical and electrical connection between the electrical connector 3 and the printed circuit board 4.

Although the present invention has been described with reference to a particular embodiment, it is not to be construed as being limited thereto. Various alterations and modifications can be made to the embodiment without in any way departing from the scope or spirit of the present invention as defined in the appended claims.

What is claimed is:

1. An electrical connector assembly comprising:
    a hard disk;
    an electrical connector engaging with the hard disk;
    a bracket defining a front region for receiving the electrical connector therein, the bracket defining a base portion and a pair of sidewalls extending from the base portion, a pair of first recesses disposed on the two sidewalls, a pair of first elastic plates received in the first recesses;
    wherein the two sidewalls define a pair of enveloping members parallel to the base portion and each enveloping member defines a second elastic plate and a second recess for receiving the second elastic plate, in assembly, the second elastic plate is partially received in the second recess; and
    wherein the pair of enveloping members cover a portion of a top surface of the hard disk with other portions of the top surface of the hard disk exposed to an exterior.

2. The electrical connector assembly as claimed in claim 1, wherein the second elastic plate defines a fixed portion, a securing portion extending from the fixed portion and an elastic portion extending curved from the securing portion.

3. The electrical connector assembly as claimed in claim 2, wherein the elastic portion defines a planar anchoring portion.

4. The electrical connector assembly as claimed in claim 3, wherein the elastic portion is configured V-shaped, the elastic portion passes through the second recess and projects outwardly towards the base plate.

5. The electrical connector assembly as claimed in claim 4, wherein the fixed portion of the second elastic plate defines a second hole, the enveloping member defines a third hole corresponding to the second hole.

6. The electrical connector assembly as claimed in claim 5, wherein the base plate defines a plurality of first holes.

7. An electrical connector assembly comprising:
    a bracket formed like a tray;
    a connector mounted upon the bracket and electrically connected to a printed circuit board which extends forwardly beyond a front edge of the bracket;
    a confinement structure formed on the bracket and cooperating with other portions of the bracket to define a hard disk receiving space; and
    a hard disk received in the hard disk receiving space and confined in both vertical and horizontal directions; wherein
    the connector is mechanically and electrically connected to the hard disk; and
    the confinement structure includes a pair of spaced top plates extending parallel to a bottom plate, the top plates covering a portion of a top surface of the hard disk with other portions of the top surface of the hard disk exposed to an exterior.

8. The electrical connector assembly as claimed in claim 7, wherein the confinement structure forms an envelope downward facing the hard disk.

9. The electrical connector assembly as claimed in claim 8, wherein a deflectable spring tang is formed on the envelope to downwardly press the hard disk.

10. The electrical connector assembly as claimed in claim 9, wherein said spring tang is structurally discrete from and materially different from the envelope.

11. The electrical connector assembly as claimed in claim 8, wherein the connector is mounted around a front end of the bracket.

12. The electrical connector assembly as claimed in claim 7, wherein the confinement structure is separately formed on the bracket.

13. The electrical connector assembly as claimed in claim 7, wherein said connector of the bracket mates with a complementary connector located at a front section of the hard disk.

14. An electrical connector assembly comprising:
    a bracket including a bottom plate and two side walls;
    a connector mounted upon the bracket and electrically connected to a printed circuit board which is exposed to an exterior;
    a confinement structure formed on the bracket and cooperating with other portions of the bracket to define a hard disk receiving space; and
    a hard disk received in the hard disk receiving space and confined in both vertical and horizontal directions; wherein the connector is mechanically and electrically connected to the hard disk and at least one spring tang resiliently engaged with the hard disk in at least in either the vertical direction or the horizontal direction; and the confinement structure includes a pair of spaced top plates extending parallel to a bottom plate, the top plates covering a portion of a top surface of the hard disk with other portions of the top surface of the hard disk exposed to an exterior.

15. The electrical connector assembly as claimed in claim 14, wherein the connector is mounted around a front end of the bracket.

16. The electrical connector assembly as claimed in claim 11, wherein the confinement structure is separately formed on the bracket.

17. The electrical connector assembly as claimed in claim 14, wherein said connector of the bracket mates with a complementary connector located at a front section of the hard disk.

* * * * *